Dec. 1, 1931.  S. C. SWINDLE  1,833,979
AUTOMOBILE GREASING RACK
Filed Nov. 12, 1930  4 Sheets-Sheet 3
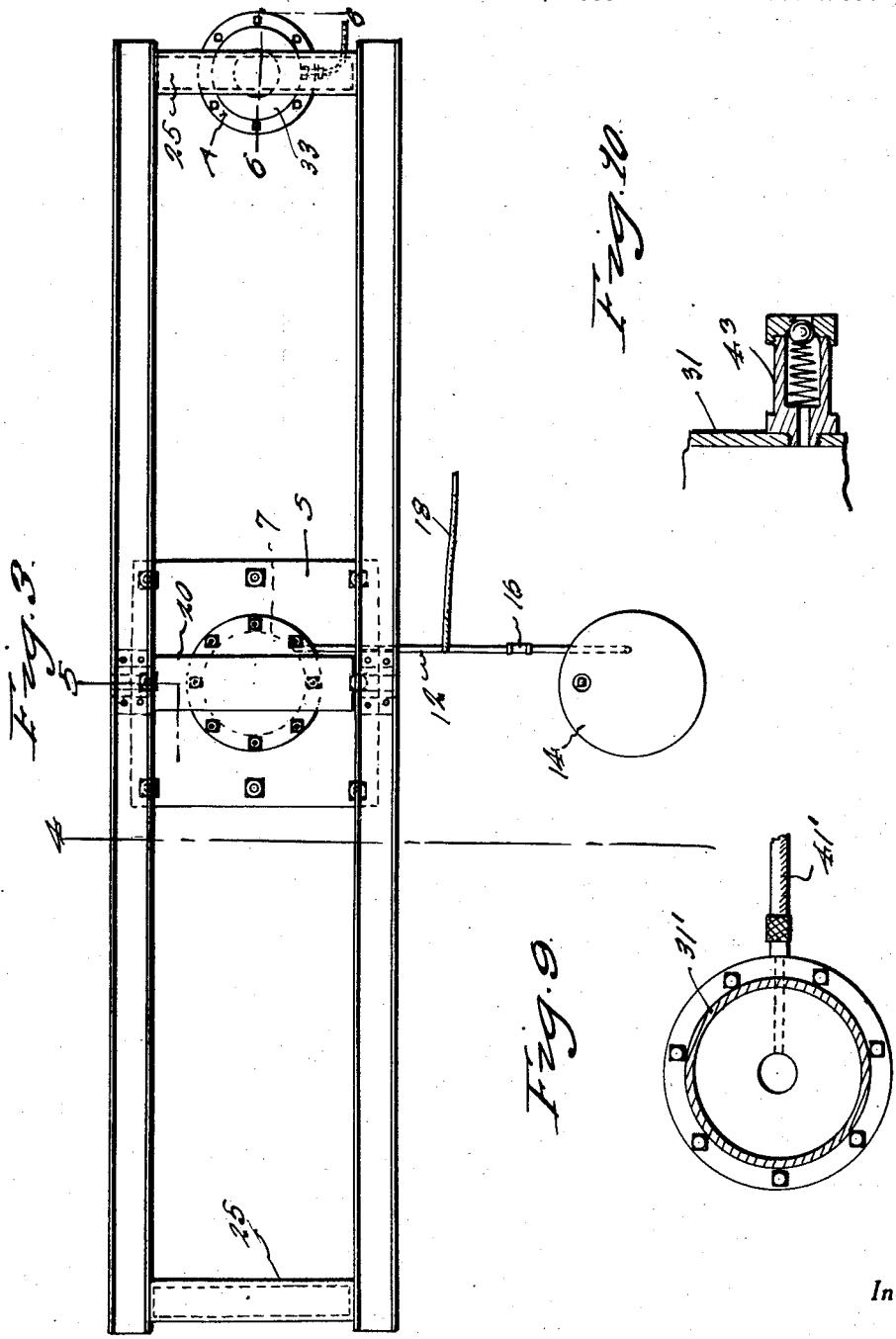
Inventor
Solomon C. Swindle
By Clarence A. O'Brien
Attorney Dec. 1, 1931.  S. C. SWINDLE  1,833,979
AUTOMOBILE GREASING RACK
Filed Nov. 12, 1930    4 Sheets-Sheet 4
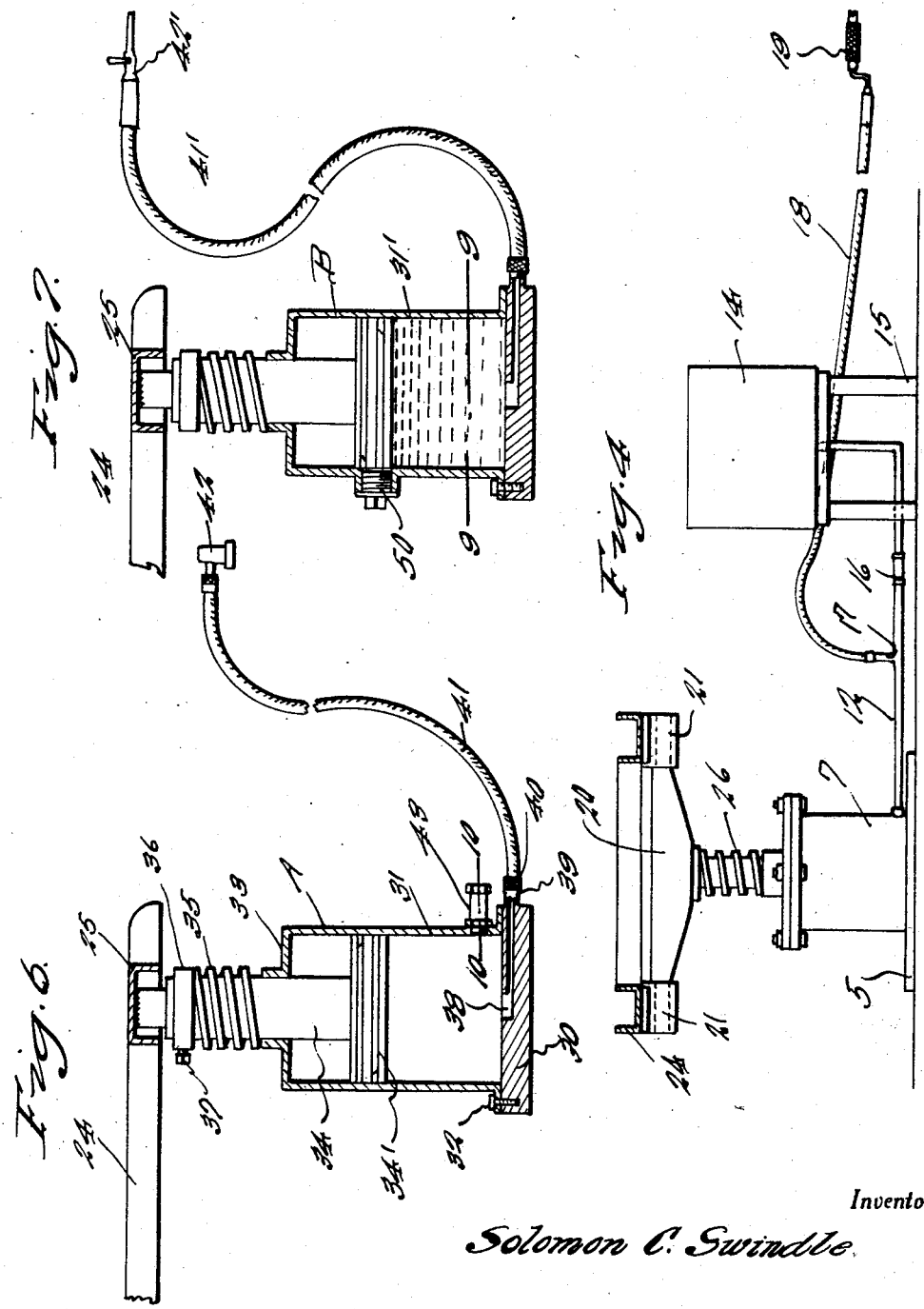
Inventor
Solomon C. Swindle
By Clarence A. O'Brien
Attorney Patented Dec. 1, 1931

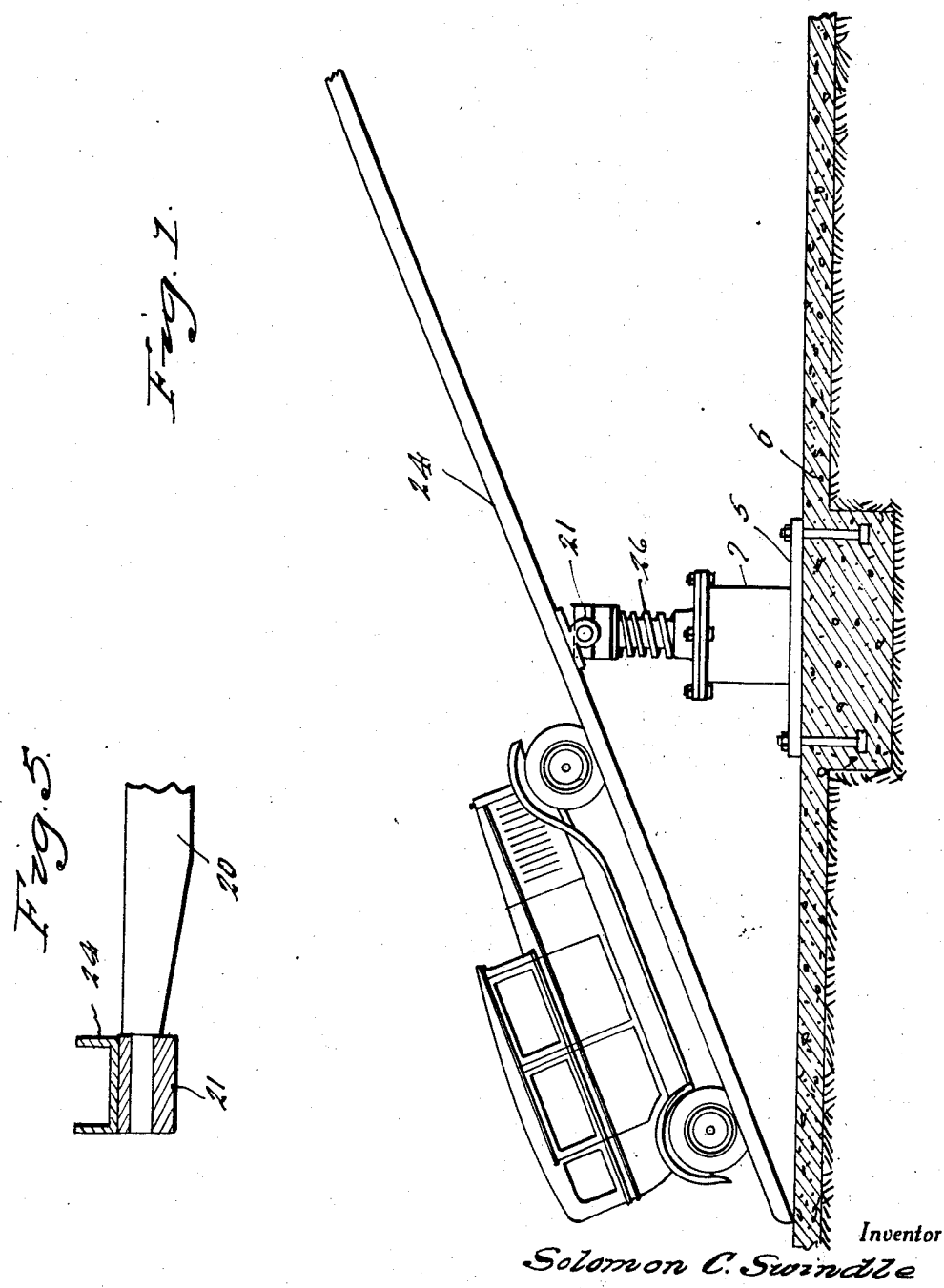

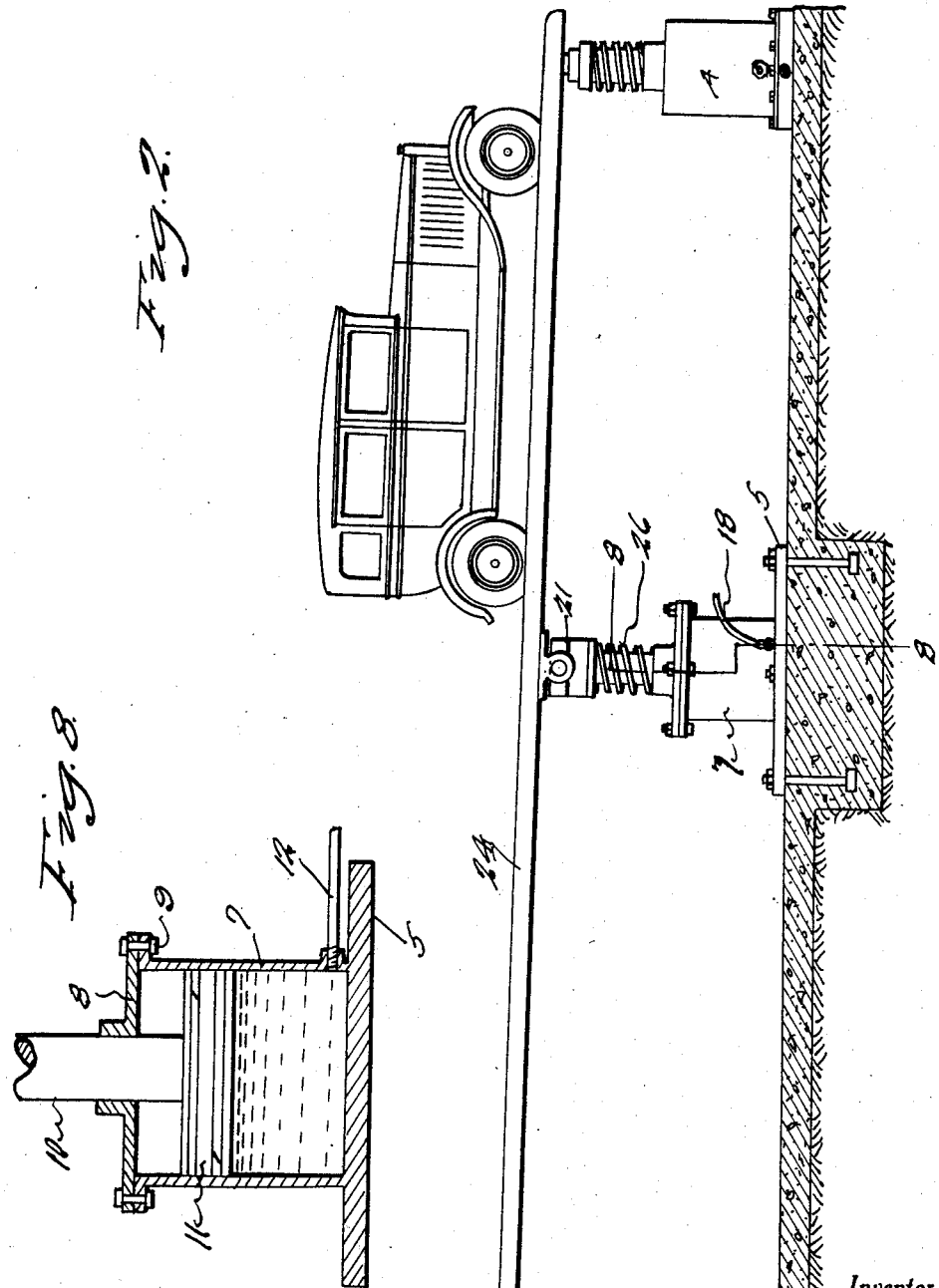

1,833,979

UNITED STATES PATENT OFFICE

SOLOMON CLIFFORD SWINDLE, OF ATHENS, GEORGIA

AUTOMOBILE GREASING RACK

Application filed November 12, 1930. Serial No. 495,185.

The present invention relates to a greasing rack for automobiles and the like and has for its prime object to provide a rack or runway mounted so that an automobile is run thereon, the weight of the automobile may be used for forcing grease, oil, air and the like from suitable containers for use in servicing the automobile.

A still further very important object of the invention resides in the provision of an apparatus of this nature which is exceedingly simple in its construction, inexpensive to manufacture, economical to operate, thoroughly efficient and reliable in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of the apparatus showing an automobile running up the inclined rack, the parts of the right hand end of the device being omitted.

Figure 2 is a similar view showing the automobile on the rack,

Figure 3 is a top plan view of the rack,

Figure 4 is a sectional view taken substantially on the line 4—4 of Figure 3,

Figure 5 is a sectional view taken substantially on the line 5—5 of Figure 3,

Figure 6 is a sectional view through the air pump apparatus,

Figure 7 is a sectional view through the oil pump apparatus,

Figure 8 is a detail section through the main greasing or oiling pump apparatus taken substantially on the line 8—8 of Figure 2, Figure 9 is a sectional view taken substantially on the line 9—9 of Figure 7, and Figure 10 is a sectional view taken substantially on the line 10—10 of Figure 6.

Referring to the drawings in detail it will be seen that the numeral 5 denotes a base anchored in concrete or the like 6. A cylinder 7 rises from the base 5 and has a detachable head 8 on the upper end thereof held in place by bolts 9 or other suitable means. A rod 10 is slidable through the center of the head 8 and has a plunger 11 on its lower or inner end for movement in the cylinder. A conduit 12 leads from the bottom of the cylinder to an elevated lubricant reservoir 14 on a stand 15. A check valve 16 is mounted in the conduit 12 to permit the flow of lubricant from the reservoir 14 to the cylinder 7 only.

A neck 17 rises from the conduit 12 between the cylinder 7 and the check valve 16 and a hose 18 is coupled therewith and has the usual dispensing gun 19 on the end thereof for engagement with the various nipples from the automobile. A cross arm 20 is rotatably mounted on the upper end of the rod 10 and on its ends has rockable bearings 21 which are attached to the centers of channeled side members 24 of the rack which includes cross members 25. A spring 26 is disposed about the rod 10 impinging against the head 8 and the cross arm 22 so as to normally hold the piston or plunger 11 in the upper end of the cylinder 7. Now when an automobile is run up the rack from either end the weight of the automobile pushes down on the rod 10 and the piston or plunger 11 tending to force the lubricant out of the cylinder 7, conduit 12, through the hose 18, sufficient pressure being created so that when the dispensing gun 19 is used in the usual manner lubricant will be dispensed therefrom. After the automobile is off the rack then the spring 26 pushes the rod 10 and the piston 11 upwardly thereby sucking in lubricant into the cylinder 7 from the supply reservoir 14.

When the automobile is run up one end of the rack as is indicated in Figure 1, I place under the other end of the rack either apparatus A or apparatus B. The apparatus A is an air pump and comprises a base 30 with a cylinder 31 rising therefrom and fixed thereto by screws 32 or the like and having a permanent head 33 at the upper end thereof through which is slidable a rod 34. A spring 35 impinges against the head 33 and against a collar 36 held on the rod 35 by a set screw 37 or other suitable means. The upper end of the rod 34 is reduced to engage in the cross member 25 as is clearly indicated in Figure 6. The base is formed with a passage 38 leading from the center of the upper surface thereof through the edge thereof into a neck 39 formed integral with the base and coupled as at 40 with a hose 41 having an air valve connection 42 of conventional structure on the end thereof.

An intake check valve 43 is engaged with the lower portion of the cylinder 31. Therefore when the automobile is positioned as shown in Figure 2 the weight of the automobile tends to force the rod 34 downwardly and also the piston 34' on the inner and lower end thereof so that air is forced out through the hose 41 into the tire or the like with which the dispensing device 42 may have been engaged.

After the automobile is run off then the spring 35 raises the rod 34 and its piston 34' so that air is sucked into the cylinders through the check valve 43.

Apparatus B is of similar construction except that cylinder 31 is adapted to contain a lubricant inserted by removal of plug 50. On the end of hose 41' there is a valved control oil spray nozzle 42' which may be used for spraying springs of the automobile or the like with a lubricant in the cylinders 31'.

It is thought that the construction, operation, utility and advantages of this invention will now be quite apparent to those skilled in this art without a more detailed description thereof.

The present embodiment of the invention has been disclosed in considerable detail merely for the purpose of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A greasing rack for automobiles comprising a cylinder containing fluid and having its lower end supported on a runway, a piston in the cylinder, a rod connected to the piston and passing through the top of the cylinder, a cross head having its central part rotatably supported on the upper end of the rod, a pair of rack members each having its central part pivotally connected to an end of the cross head, one on one end and the other on the opposite edge, each rack being of channel shape in cross section, said rack members in its open position providing an inclined runway for an automobile, the weight of which will tilt the rack members to horizontal position when the forward wheels pass the pivotal point, means at one end of the rack for limiting downward movement of this end of the rack, the weight of the automobile on the rack forcing the piston downwardly to compress the fluid in the cylinder, a tube connected with the lower part of the cylinder and a valve therein for preventing escape of the fluid from the cylinder until the valve is opened and a spring on the rod between the cross head and the top of the cylinder normally holding the parts in raised position.

In testimony whereof I affix my signature.
SOLOMON CLIFFORD SWINDLE.